(12) United States Patent
Harpur et al.

(10) Patent No.: US 10,659,524 B2
(45) Date of Patent: May 19, 2020

(54) PREFERRED CONTACT DECISION SERVICE

(71) Applicant: International Business Machines Corporation, Armonk, NY (US)

(72) Inventors: Liam S. Harpur, Dublin (IE); Erik H. Katzen, Argyle, TX (US); Sumit Patel, Irving, TX (US); Pascal Wagner, Saulheim (DE)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 15/172,608

(22) Filed: Jun. 3, 2016

(65) Prior Publication Data

US 2017/0353529 A1 Dec. 7, 2017

(51) Int. Cl.
*H04L 29/08* (2006.01)
*G06Q 50/00* (2012.01)

(52) U.S. Cl.
CPC .............. *H04L 67/10* (2013.01); *G06Q 50/01* (2013.01); *H04L 67/14* (2013.01); *H04L 67/18* (2013.01); *H04L 67/306* (2013.01)

(58) Field of Classification Search
CPC ......... H04L 67/10; H04L 67/14; H04L 67/18; H04L 67/306; G06F 17/30864
USPC .......................................................... 709/203
See application file for complete search history.

(56) References Cited

U.S. PATENT DOCUMENTS

| 5,448,750 | A | * | 9/1995 | Eriksson | ............... | H04W 16/04 |
| | | | | | | 455/452.2 |
| 5,689,642 | A | | 11/1997 | Harkins et al. | | |
| 7,269,627 | B2 | | 9/2007 | Knauerhase | | |
| 7,483,525 | B2 | | 1/2009 | Chaddha et al. | | |
| 7,889,719 | B2 | | 2/2011 | Xu | | |

(Continued)

OTHER PUBLICATIONS

Mu et al., "Absorptive and disseminative capacity: Knowledge transfer in intra-organization networks", ELSEVIER, Expert Systems with Applications 37 (2010) 31-38, © 2009 Elsevier Ltd., doi:10.1016/j.eswa.2009.05.019, 8 pages.

(Continued)

*Primary Examiner* — Minh Chau Nguyen
(74) *Attorney, Agent, or Firm* — Christopher K. McLane; Alexander G. Jochym

(57) ABSTRACT

In an approach for determining a preferred communication channel, the computer receives a query that includes a unique client identifier. The computer retrieves one or more communication channels from an entry within a data repository, wherein the entry is associated with the received query. The computer determines one or more communication channel results based, at least in part, on one or more success rates respectively associated with the retrieved one or more communication channels within the data repository. The computer creates a first ordered list of communication channel results in which the determined one or more communication channel results are ordered based, at least in part, on the one or more success rates of the determined one or more communication channels. The computer selects a preferred communication channel from the created first ordered list of communication channel results. The computer initiates a communication via the selected preferred communication channel.

17 Claims, 3 Drawing Sheets

(56) References Cited

U.S. PATENT DOCUMENTS

| | | |
|---|---|---|
| 8,166,119 B2 | 4/2012 | Ligh et al. |
| 8,630,883 B2 | 1/2014 | Law |
| 8,719,368 B2 | 5/2014 | Tseng |
| 9,253,804 B2 | 2/2016 | Amidon et al. |
| 2008/0137634 A1* | 6/2008 | Hassan ................ H04L 5/0007 370/343 |
| 2009/0028183 A1 | 1/2009 | Landers et al. |
| 2009/0222333 A1 | 9/2009 | Rivas |
| 2011/0179126 A1 | 7/2011 | Wetherell et al. |
| 2012/0130819 A1 | 5/2012 | Willcock et al. |
| 2014/0080532 A1* | 3/2014 | Oh ........................ H04W 28/26 455/512 |
| 2014/0180595 A1* | 6/2014 | Brumback ........... A61B 5/0015 702/19 |
| 2014/0214994 A1 | 7/2014 | Rueckert et al. |
| 2014/0278977 A1* | 9/2014 | Newton ............. G06Q 30/0255 705/14.53 |
| 2014/0357234 A1* | 12/2014 | Sullivan ................ H04W 4/06 455/412.1 |
| 2015/0268951 A1 | 9/2015 | Wang et al. |
| 2016/0012194 A1* | 1/2016 | Prakash ............ G06Q 30/0601 705/2 |
| 2016/0044142 A1 | 2/2016 | Hsiao et al. |
| 2016/0125348 A1* | 5/2016 | Dyer ................ G06Q 10/06398 705/7.42 |
| 2016/0255139 A1* | 9/2016 | Rathod ............... G06F 16/9535 709/203 |
| 2017/0039327 A1* | 2/2017 | Bitran .................... G06F 19/324 |
| 2017/0039886 A1* | 2/2017 | Bitran .................... G06F 3/0482 |
| 2017/0131965 A1* | 5/2017 | Eerola ..................... G06F 3/165 |
| 2017/0277138 A1* | 9/2017 | Kaji ......................... A61B 5/11 |
| 2018/0110959 A1* | 4/2018 | Cronin ................. A61B 5/6801 |

OTHER PUBLICATIONS

"Dynamic Prioritization and Selection of Communication Method Based on Data Mining", An IP.com Prior Art Database Technical Disclosure, Authors et. al.: Disclosed Anonymously, IP.com No. IPCOM000242202D, IP.com Electronic Publication Date: Jun. 25, 2015, 3 pages.

"Routing A Message To A Recipient Preferred Communication Medium Based On Historical Data", An IP.com Prior Art Database Technical Disclosure, Authors et. al.: Disclosed Anonymously, IP.com No. IPCOM000242036D, IP.com Electronic Publication Date: Jun. 15, 2015, 3 pages.

* cited by examiner

PREFERRED CONTACT DECISION SERVICE

BACKGROUND

The present invention relates generally to the field of communication channels, and more particularly to identifying a preferred means of contact through which an individual receives communications from another individual.

Communication channels are a medium through which individuals and/or organizations communicate through messages (e.g., voice, text, video, etc.). Face-to-face or personal communication (e.g., in-person, video conferencing, etc.) allows an individual or individuals to interact and interpret a message in light of visual and auditory cues provided by physical presence, tone of voice, and facial expressions, thereby increasing the ability of the individuals to correctly interpret the message. Mobile communication channels (e.g., telephone communications, mobile phone communications, etc.) allow for an interactive exchange between individuals that is limited to auditory cues, allowing additional interpretation of the message based on tones of voice. Electronic communication channels encompass email, Internet, intranet and social media platforms that can be used for one-on-one, group, or mass communication thereby allowing a combination of multiple types of media (e.g., text, graphics, sound, video, etc.) and two-way communication (e.g., interactive communication). Written communication channels deliver messages that do not necessarily necessitate interaction with an individual and/or group (e.g., policies, letters, memos, notices, announcements, etc.), in which interpretation of the message is based on the clarity of the written message.

SUMMARY

Aspects of the present invention disclose a method, computer program product, and system for determining a preferred communication channel, the method comprising one or more computer processors receiving a query that includes a unique client identifier. The method further comprises one or more computer processors retrieving one or more communication channels from an entry within a data repository, wherein the entry is associated with the received query. The method further comprises one or more computer processors determining one or more communication channel results based, at least in part, on one or more success rates respectively associated with the retrieved one or more communication channels within the data repository. The method further comprises one or more computer processors creating a first ordered list of communication channel results in which the determined one or more communication channel results are ordered based, at least in part, on the one or more success rates of the determined one or more communication channels. The method further comprises one or more computer processors a preferred communication channel from the created first ordered list of communication channel results. The method further comprises one or more computer processors initiating a communication via the selected preferred communication channel.

DETAILED DESCRIPTION

Communication is conveyed in several forms, including verbal and written methods. To effectively convey information through communication, an appropriate communication channel needs to be selected. Embodiments of the present invention recognize that individuals utilize multiple communications channels to communicate with other individuals. For example, a single individual utilizes multiple communications channels associated with multiple e-mail addresses (e.g., home e-mail, work e-mail, etc.), multiple phone numbers (e.g., home phone, work phone, mobile work phone, personal mobile phone, etc.), and multiple social media networks to communicate with other individuals. Embodiments of the present invention further recognize that the most effect communication channel to communicate with an individual is not uniform and is therefore subject to change based on multiple factors (e.g., date, time, issue, location, purpose of communication, company guidelines, purpose of communication, etc.). Embodiments of the present invention provide a determination of a preferred communication channel to contact an individual in order to facilitate successful communications.

Figure 1:
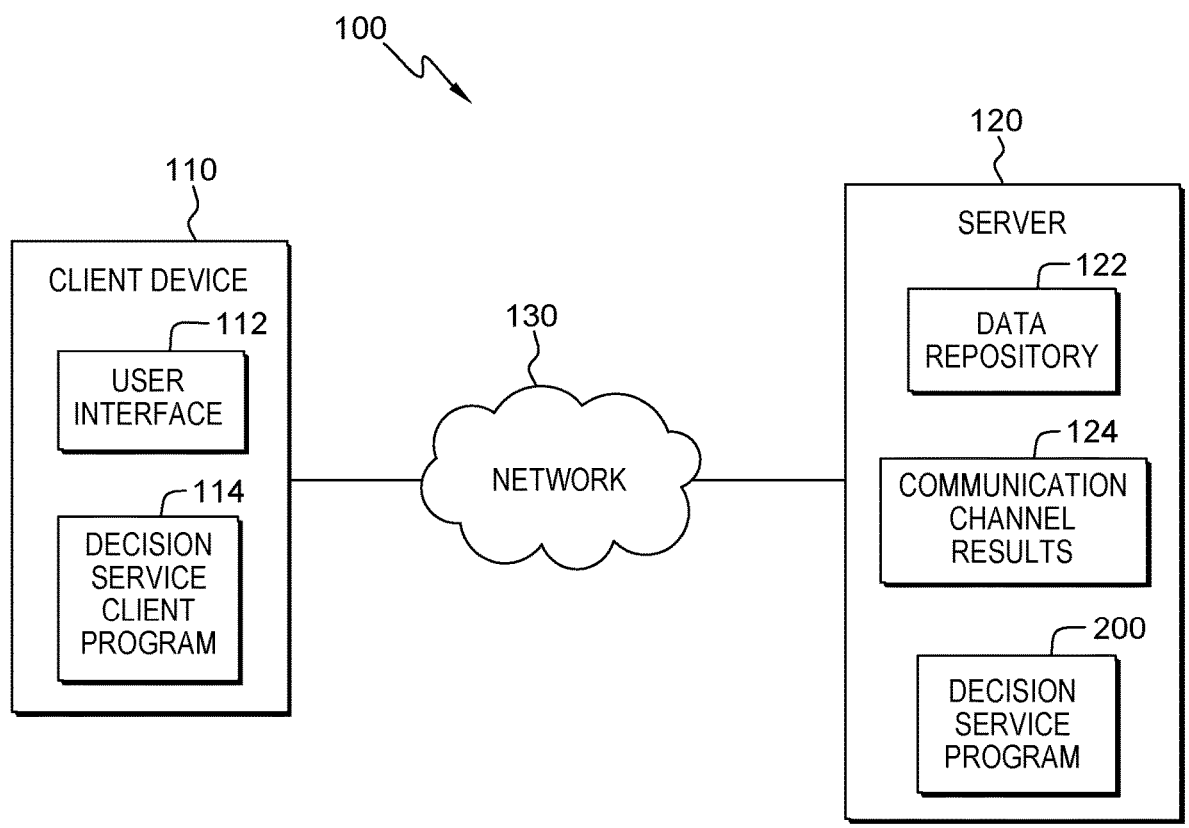
FIG. 1 is a functional block diagram illustrating a distributed data processing environment, in accordance with an embodiment of the present invention.

The present invention will now be described in detail with reference to the Figures. FIG. 1 is a functional block diagram depicting a distributed data processing environment, generally designated 100, in accordance with one embodiment of the present invention. FIG. 1 provides only a depiction of one embodiment and does not imply any limitations with regard to the environments in which different embodiments may be implemented.

In the depicted embodiment, distributed data processing environment 100 includes client device 110 and server 120 interconnected over network 130. Distributed data processing environment 100 may include additional computing devices, mobile computing devices, servers, computers, storage devices, or other devices not shown.

Client device 110 may be any electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating over network 130. In other embodiments, client device 110 may represent a server computing system utilizing multiple computers as a server system, such as in a cloud computing environment. In general, client device 110 is representative of any electronic device or combination of electronic devices capable of executing machine readable program instructions. Client device 110 contains user interface 112 and decision service client program 114.

User interface 112 is a program that provides an interface between a user of client device 110 and a plurality of applications that reside on client device 110 (e.g., decision service client program 114) and/or may be accessed over network 130. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information through decision service client program 114 to decision service program 200.

Decision service client program 114 represents a software application that sends and receives information to and from decision service program 200, to assist a user in contacting another individual based on a determined preferred communications channel. Decision service client program 114 provides information regarding individuals that the user contacts (e.g., available communication channels, success of initiated contact via a communication channel, etc.) to decision service program 200 for inclusion in data repository 122 for future use by decision service program 200. Additionally, decision service client program 114 provides an interface for the user to query decision service program 200 and receive determined preferred communication channels from decision service program 200 (e.g., communication channel results 124). In the depicted embodiment, decision service client program 114 resides on client device 110. In another embodiment, decision service client program 114 may reside on another computing device or multiple computing devices (not shown) connected over network 130, provided decision service client program 114 is accessible to decision service program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 is representative of any electronic device or combination of electronic devices capable of executing machine readable program instructions as described in greater detail with regard to FIG. 3, in accordance with embodiments of the present invention. In various embodiments, server 120 contains data repository 122, communication channel results 124, and decision service program 200 as depicted and described in further detail with respect to FIG. 3.

Data repository 122 is a database that stores information pertaining to individuals for utilization by decision service program 200. Data repository 122 includes information associated with each individual that identifies: known communication channels (i.e., known manners of contacting the individuals), preferred communications channels (e.g., mobile phone, e-mail, etc.), success rates (i.e., a percentage that indicates contact is established), and additional factors (e.g., date, time, issue, location, purpose of communication, company guidelines, purpose of communication, etc.). Information regarding an individual is stored within data repository 122 based on a unique client identifier (e.g., client name, account number, customer number, etc.) Decision service program 200 utilizes data repository 122 in order to determine a preferred communications channel associated with an individual for the purpose of contacting the individual. In one embodiment, decision service program 200 enters new information into data repository 122 (e.g., a new entry for an individual) and/or updates existing information within data repository 122 based on the received results that determine preferred communications channels, user inputs, and updates to general individual information (e.g., changes to communication channels). Decision service program 200 extracts information from an information source (e.g., a form, an e-mail, a database, a social network, a wearable device, a company directory, etc.) and enters the information into data repository 122. In another embodiment, a user enters new information and/or updates existing information within data repository 122. In the depicted embodiment, data repository 122 resides on server 120. In another embodiment, data repository 122 resides on client device 110. In some other embodiments, data repository 122 may reside on another computing device, multiple computing devices, or server (not shown) provided data repository 122 is accessible by decision service program 200.

Communication channel results 124 are the output of decision service program 200. Communication channel results 124 identify the preferred communications channels associated with an individual. A user can utilize communication channel results 124 to contact the individual. In one embodiment, communication channel results 124 identifies the most likely communications channel for contacting the individual successfully. In another embodiment, communication channel results 124 provides an ordered listing of the communications channels based on the probability of successfully establishing contact (e.g., starts with the most likely communications channel and ends with the least likely communication channel), which the user follows in order to attempt to successfully contact the individual. For example, within data repository 122 an individual has four communications channels identified: a home phone, a mobile phone, an e-mail address, and a mailing address. The individual contacted a cable company about a service outage. The cable company provides the individual with Internet, cable, and home phone. The technician needs to contact the individual to provide support in real-time. Decision service program 200 organizes the four communications channels, with the mobile phone number first, followed by the home phone and/or the e-mail address (e.g., the individual may have a remote device that allows a connection to the e-mail server thus allowing access to e-mail), and finally the mailing address. In the depicted embodiment, communication channel results 124 reside on server 120. In another embodiment, communication channel results 124 reside on client device 110. In some other embodiment, communication channel results 124 may reside on another client device, multiple client devices, or a server (not shown) provided communication channel results 124 are accessible by decision service client program 114.

Network 130 may be a local area network (LAN), a wide area network (WAN) such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Decision service program 200 is a program for determining a preferred communication channel from communication channels associated with an individual within data repository 122. Decision service program 200 provides a user of client device 110 with the preferred communications channel in the form of communication channel results 124 for the purpose of contacting the individual over the preferred communication channel. Decision service program 200 sends and receives information to and from client device 110 though decision service client program 114. For example, decision service program 200 receives queries that are associated with an individual to initiate a determination of a preferred communications channel and raw data (e.g., results, communications channels, new information associated with an individual, etc.) for incorporation in data repository 122 from decision service client program 114. Decision service program 200 sends communication channel results 124 through decision service client program 114 to client device 110 for display by user interface 112 in response to a received query. In the depicted embodiment, decision service program 200 resides on server 120. In another embodiment, decision service program 200 resides on client device 110. In some other embodiment, decision service program 200 resides on another client device, client devices or server (not shown) provided decision service program 200 has access to data repository 122.

Figure 2:
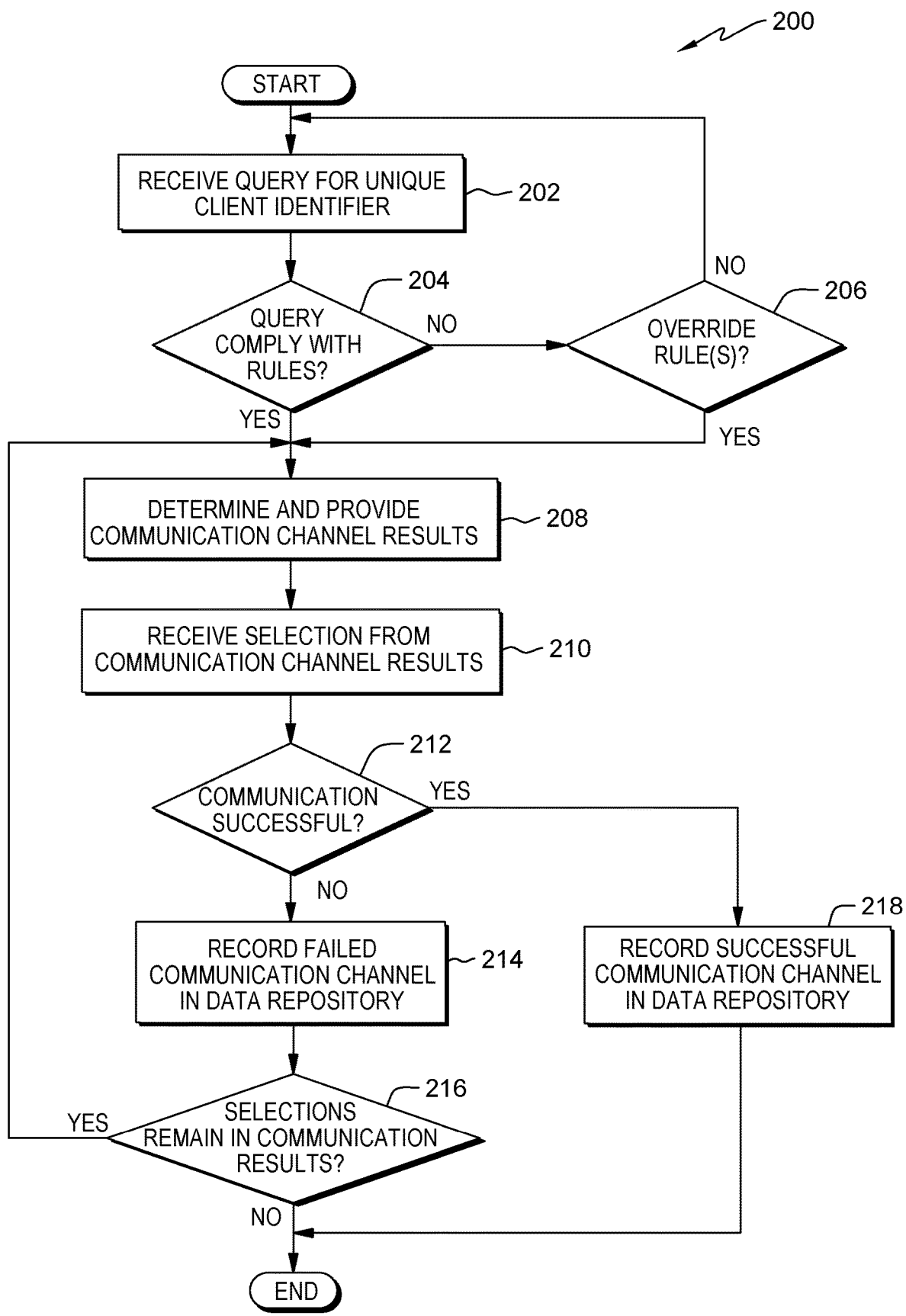
FIG. 2 is a flowchart depicting operational steps of a decision service program, on a server computer within the distributed data processing environment of FIG. 1, for determining and providing a preferred communications channel associated with an individual to a user that the user utilizes to initiate contact with the individual, in accordance with an embodiment of the present invention.

FIG. 2 is a flowchart depicting operational steps of decision service program 200, a program for determining and providing a preferred communications channel associated with an individual to a user that the user utilizes to initiate contact with the individual, in accordance with an embodiment of the present invention. FIG. 2 provides only a depiction of one embodiment and does not imply any limitations to decision service program 200 in which different embodiments may be implemented. In one embodiment prior to decision service program 200 initiating, data repository 122 is previously populated with information regarding individuals and associated communication channels. For example, a user creates data repository 122 manually and/or by importing and/or extracting information from other sources into data repository 122 (i.e., information from e-mail address books, social network friends, professional business social networks, company contact lists, etc.). In another embodiment upon initiation of decision service program 200, decision service program 200 creates data repository 122. For example, the first time decision service program 200 initiates, data repository 122 does not exist or does not include information associated with individuals. In one embodiment, decision service program 200 enters a data collection/and or extraction mode and creates data repository 122. In another embodiment, a user initiates entry of data instead of a query and manually enters data into data repository 122 and/or initiates data extraction from the raw data through decision service client program 114. In some other embodiments, the user may initiate an update, and decision service program 200 incorporates results from a previous iteration of decision service program 200 and/or new raw data into data repository 122.

In step 202, decision service program 200 receives a query for a unique client identifier. The unique client identifier is a name (e.g., user name, nick name, first and/or last name, company name, combination of names and/or letters, etc.), number (e.g., account number, phone number randomly generated number, etc.), and/or a combination of names, letters, numbers, and/or special characters, etc. that uniquely identifies an entry associated with an individual and/or entity (e.g., company, division, group, etc.) within data repository 122. The unique client identifier identifies a specific entry within data repository 122, associated with the individual and/or entity, which includes the information regarding communication channels, preferences, and additional factors (e.g., wearable device, social networks, global positioning system data, etc.) for analysis by decision service program 200. Additionally, the query may also include information pertaining to one or any combination of a severity level, an initial manner of contact, and a purpose of contact that decision service program 200 utilizes for further processing.

A severity level, as pre-defined in the rules, is a perceived, assigned, and/or determined degree of impact to a user (e.g., client) that an encountered defect (e.g., error, a failure, a problem, etc.) with respect to a component, an application, and/or a system, has on the ability of the user to perform work. The severity levels may include: critical (e.g., catastrophic, level one, etc.); major (e.g., major level 2, etc.); minor (e.g., minimal, level three, etc.); and trivial (e.g., low, informational, level four, nominal, customer service request, etc.) A critical severity level occurs in an instance in which the client cannot continue work (e.g., stopped or severely impacted), and a work around is not available. For example, the client runs a product application and encounters a major malfunction, which shuts down the product application and becomes inoperative. The running of the product application is critical to the business of the client, and is therefore considered an emergency that requires an immediate response. A severity level of major occurs in an instance in which the client loses major functionality and/or data is impacted, however a workaround is available but the workaround is difficult and/or non-obvious. A severity of minor occurs in an instance in which the client encounters a loss of minor functionality and/or not-critical data, however, a simple workaround is available. A severity level of trivial occurs in an instance in which the client does not lose functionality or data and productivity or efficiency is not impacted. The severity level includes a pre-defined response time that identifies a minimum and maximum amount of time (i.e., time frame) within which the user is to contact the client. For example, the response time for the critical severity is immediate, while the response time for trivial is within three days. Decision service program 200, the client, and/or the user select and/or modify the severity level.

In one embodiment, decision service program 200 receives the query from decision service client program 114 via user interface 112 as a direct input of the unique client identifier (e.g., a user manually enters unique client identifier). In another embodiment, decision service program 200 receives a selection of the unique client identifier from a list or list subset of unique client identifiers found within data repository 122. For example, the user specifies the name of a company, and decision service program 200 identifies all of the individuals (i.e., identified all the entries within data repository 122) that include the specified company name. In another embodiment, decision service program 200 receives the query as a selection from a list of stored queries associated with unique client identifiers. In some other embodiments, decision service program 200 receives the query through an automated process. For example, a user schedules decision service program 200 to initiate a stored a query at a specified time (e.g., at startup, every Monday, once a day, etc.). Decision service program 200 initiates upon receipt of the query.

In alternative embodiments, decision service program 200 receives a unique client identifier that is new. In one embodiment, decision service program 200 determines that the entry does not exist in data repository 122. In another embodiment, decision service program 200 receives an indication from the user to create a new unique client identifier. Decision service program 200 creates an entry within data repository 122 for the unique client identifier. Decision service program 200 populates the fields within the entry with information supplied by the user manually and/or through automatic data extraction from data sources (e.g. webforms, forms, e-mails, identified social networks, signature files, headers, etc.) based on predefined settings (e.g., identify data fields, character and/or numerical formats, keywords, etc. from which to extract data). For example, the user receives an e-mail or webform (e.g., document created and submitted by the individual that discloses contact information) from an individual. Decision service program 200 receives an indication to automatically assign a unique client identifier from the user and extract data from the webform. Decision service program 200 utilizes the predefined settings to extract an e-mail address, name, phone number, address, and information that indicates preferences. Additionally, decision service program 200 receives an indication to search social networks based on the e-mail address, name, phone number, etc. extracted from the webform to identify which social networks the individual utilizes. Decision service program 200 updates data repository 122 for the new unique client identifier with the entered and/or extracted data.

In another embodiment, decision service program 200 receives a unique client identifier with an indication for verification and/or update with data repository 122. Decision service program 200 compares the fields within the entry with information supplied by the user manually and/or through automatic data extraction from data sources (e.g. webforms, forms, e-mails, identified social networks, signature files, headers, etc.) based on predefined settings (e.g., identify data fields, character and/or numerical formats, keywords, etc. from which to extract data) to identify new data and/or updates to existing data. Decision service program 200 adds additional fields and/or updates existing fields with the new data for the corresponding entry within data repository 122. In one embodiment, decision service program 200 stores the prior data of a field until the user verifies the updated data is correct (e.g., successfully contacts the client via the communication channel that includes the updated information.) For example, the user receives an e-mail from the client that includes a signature file that includes an e-mail, a social network, a business social network, a work phone number, and a mobile phone number. The user selects an option within decision service client program 114 to verify the existing data in data repository 122 with the signature file of the e-mail. Decision service program 200 extracts the data from the signature file and compares the data with the existing data with data repository 122. Decision service program 200 determines the mobile phone number from the signature file does not match the mobile phone number stored within data repository 122. Decision service program 200 updates the mobile phone number as the primary mobile phone number and stores the prior mobile phone number as a secondary mobile phone number as a backup. Additionally within the signature file, decision service program 200 identifies a new business social network link in the signature file that is not included in data repository 122. Decision service program 200 extracts the data from the business social network link, and populates the fields of the entry, thereby adding a new communication channel for the business social network within data repository 122.

In decision 204, decision service program 200 determines whether the query complies with rule(s). Rules include business rules, user rules, and/or a combination of business rules and user rules. Business rule(s) are rule(s) (e.g., predefined conditions) set by a company policy that identify guidelines for a user (e.g., employee) contacting an individual (e.g., customer, client, etc.). For example, a business rule states that (i) after the user initiates contact for a first time (i.e., a first contact) with a customer via a communications channel and (ii) the use has not received a reciprocal contact from the customer since the first contact, the user is not allowed to contact the customer for a second time until five days elapse following the first contact. User rules are a rule or rules (e.g., predefined conditions) set by the user that replace and/or augment business rules for contacting an individual based on personal knowledge and/or interactions with a customer. For example, in a working relationship between the user and a customer, the customer directs the user to initiate contact a second time if more than two days transpire without receiving a response. Based on the customer direction, the user creates a user rule to replace (e.g., supersede, modify, augment, etc.) the business rule which allows for a second contact with the customer to occur prior to the five days set by the business rule. In one embodiment, decision service program 200 does not include business rules and/or user rules (e.g., does not identify restrictions, guidelines, and/or best practices). In another embodiment, decision service program 200 includes one or more business rules and/or one or more user rules (e.g., single rule dependency, multiple rule dependencies, combination of multiple dependencies of various rule types).

Decision service program 200 evaluates the query with respect to the business rules and/or user rules. Decision service program 200 accesses the entry within data repository 122 associated with the unique client identifier. In one embodiment, decision service program 200 retrieves information from the entry associated with the unique client identifier that corresponds to the predefined condition specified within the business rule and/or user rule. Decision service program 200 compares the retrieved information with the predefined conditions of the business rule and/or user rules in order to determine compliance or non-compliance with the business rule and/or user rule. For example, decision service program 200 accesses an entry within data repository 122 for the unique client identifier of a customer. Decision service program 200 retrieves the date of the last recorded contact with the customer, which was Monday. Decision service program 200 determines today's date is Tuesday, and the customer has not responded to date. However, decision service program 200 determines that only one day transpired since initial contact, and therefore, the query is not in compliance with either the business rule (e.g., five days) or the user rule (e.g., two days). In another embodiment, decision service program 200 does not identify rules (e.g., no rules are set) associated with the unique client identifier and automatically determines compliance. In some other embodiment, decision service program 200 determines partial compliance of the query with respect to the rules. For example, a business rule may prohibit the user from calling a customer a second time within a twenty-four hour period, but allows contact via social networks, e-mail, and of physical mailings. Decision service program 200 stores restrictions based on the rule for further utilization.

If decision service program 200 determines that the query complies with the rule(s) or no rules are set (decision 204, yes branch), then decision service program 200 determines and provides communication channel results 124 (step 208).

If decision service program 200 determines the query does not comply with the rule(s) (decision 204, no branch), then decision service program 200 determines whether to override the rule(s) (decision 206).

In decision 206, decision service program 200 determines whether to override the rule(s). Decision service program 200 displays a message to the user via user interface 112. In one embodiment, decision service program 200 displays a message that provides feedback regarding the rule(s) that is not met. For example, the feedback states that the minimum number of days have not transpired, and initiating contact at the current time is not in accordance with the rules. In another embodiment, decision service program 200 displays a message that includes feedback regarding the rule(s) that is not met and when the rule(s) will be met. In some other embodiment, decision service program 200 displays a generic message that states non-compliance with the rule(s). Decision service program 200 displays an additional message to the user that provides the option to override the rule or that indicates the rule(s) do not allow an override and includes a request for a user selection in order to continue (e.g., override, ok, continue, yes, no, cancel, etc.). Decision service program 200 receives a selection via user interface 112 from the user through decision service client program 114. Decision service program 200 applies decision logic based on the user selection and determines further actions.

If decision service program 200 determines to override the rules(s) (decision 206, yes branch), then decision service program 200 determines and provides communication channel results 124 (step 208). For example, decision service program 200 determines that the business rule allows for an override and decision service program 200 receives a selection from the user to continue with processing of the query, thereby allowing an override to occur. If decision service program 200 determines to not override the rule(s) (decision 206, no branch), then decision service program 200 returns and receives a query for a unique client identifier (step 202). For example, decision service program 200 determines that an override of the rule is not allowed and/or receives a selection from the user that instructs decision service program 200 not to continue with processing the query. Subsequently, decision service program 200 stops processing the current query and returns to receive another query for a unique client identifier. Upon receipt of a new unique client identifier, decision service program 200 initiates.

In step 208, decision service program 200 determines and provides communication channel results 124. Decision service program 200 retrieves the data associated with the unique client identifier within data repository 122. Decision service program 200 identifies the communications channels within the entry (e.g., e-mail, work phone, home phone, mobile phone, social networks, and physical address), and information associated with the individual communications channels such as: success rates, individual identified preferences (i.e., preferred communication channel for contact), time of day preferences (e.g., daytime call mobile phone, nighttime call home phone), location (e.g., physical location of individual at a specified time and/or day, etc.) from data repository 122. Decision service program 200 analyzes the retrieved data with respect to current conditions (e.g., location, time of day, day of week, etc.) and determines communication channel results 124. Decision service program 200 organizes the communications channels within communication channel results 124 from most likely to result in successful communication to least likely to result in successful communication, thereby providing an order of preferred communication channels for the user to follow and/or select from, in order to establish communication with the customer.

For example, a new product is being released that a salesman believes a customer will be interested in purchasing, and therefore, the salesman wants to contact the customer to discuss the new product. The salesman enters the unique client identifier through decision service client program 114, and decision service program 200 initiates the query. Decision service program 200 accesses data repository 122 with the unique client identifier, and retrieves the data within the associated entry. The data associated with the entry includes: a first call back number associated with a work phone number with contact times between 9 a.m. and 5 p.m., Monday through Friday; a second call back number associated with a mobile phone number; and a preferred contact time between 12 p.m. and 2 p.m.; Monday through Friday and weekends between 11 a.m. and 2 p.m.; and a third preferred contact of e-mail. Additionally, decision service program 200 identifies high success rates (e.g., 95%) associated with the work phone from 9 a.m.-12 p.m., 2 p.m.-3:30 p.m., high success rates (e.g., 80%) on the mobile phone between 1 p.m. and 2 p.m., and low success rates (e.g., 20%) associated with the work phone from 12 p.m.-2 p.m. and 3:30 p.m. to 5 p.m. Decision service program 200 acquires the current time which is 12:15 p.m. on a Friday. Decision service program 200 analyzes the retrieved data with respect to the current time, and determines communication channel results 124 to be: the mobile phone with a suggested calling time between 1 p.m. and 2 p.m. (e.g., based on the comparison of the two success rates, 20% for the work phone and 80% for the mobile phone, with respect to the local time, 12:15 p.m., decision service program 200 determines calling on the mobile phone between 1 p.m. and 2 p.m. is the preferred communication channel and better time); followed by the mobile phone with a suggested calling time that matches the current time (time is within the noted preferences); followed by the work phone with a suggested calling time of after 2 p.m., but before 3:30 p.m., and lastly an e-mail address.

In one embodiment, decision service program 200 retrieves data from wearable devices to provide additional information to further identify preferred communications channels within communication channel results 124. Wearable devices are clothing and/or accessories that incorporate computer and advanced technologies for personal and business use. Wearable devices include the following functions: fitness trackers, heart rate monitoring, step counters, activity trackers, sleep trackers, sport trackers, synchronization of data and communications from gadgets, health issue monitoring, gauge alertness and energy levels, navigation tools, media devices, and communication gadgets. Activity trackers includes wireless communication capabilities and connects to an online service to updates status of associated with the individual throughout the day. For example, the user wears an activity tracker that provides heart rate monitoring, calculates a number of steps taken, identifies periods of activity, and determines sleep patterns. Decision service program 200 connects to the online service associated with the wearable device and access the activity information associated with the unique client identifier. Decision service program 200 utilizes the information from the wearable device (e.g., steps, heart rate, etc.) to anticipate periods of time the customer is available. For example, decision service program 200 associates a high heart rate and increasing with a customer that is moving and therefore, unavailable for communication. Decision service program 200 associates a low resting heart rate and very few steps with a customer that is stationary or within a fixed location, and therefore, available for communication. Decision service program 200 associates a very low heart rate with no steps with a customer that is resting and/or asleep, and therefore, unavailable for communication. Decision service program 200 incorporates the information from the wearable device with the information retrieved from data repository 122 to further refine and/or update communication channel results 124.

For example, at 12:15 p.m. decision service program 200 connects to the online service associated with the wearable device, and receives an indication that the customer initiated tracking of an exercising activity at 12:10 p.m. Decision service program 200 also receives information regarding an average duration of the exercise activity from the online service to be an hour and twenty minutes. Decision service program 200 incorporates the information from the wearable device and online service, and updates communication channel results 124 to be as follows: updates the mobile phone to a suggested calling time between 1:30 p.m. and 2 p.m. (e.g., client is currently busy, but projects exercise ends by 1:30 p.m.), removes the mobile phone with a suggested calling time that matches the current time (e.g., client is known to be unavailable), followed by the work phone with a suggested calling time of after 2 p.m., but before 3:30 p.m., and then an e-mail.

In another embodiment, decision service program 200 retrieves data from social networks (e.g., personal social networks, business social networks, etc.), in which the client is a member, in order to provide additional information to further identify preferred communications channels within communication channel results 124. For example, the client is a member of a social network and a business social network, in which the social network connects the client to individuals based on personal relationships (e.g., friend, family, acquaintances, etc.), and the business social network connects the client to individuals based on working relationships (e.g., co-workers, business associates, etc.). In one embodiment, decision service program 200 accesses the social networks and determines a status associated with the customer (i.e., online or offline). In another embodiment, decision service program 200 determines the time of the most recent post by the client. In some other embodiment, decision service program 200 identifies a location associated with a status (e.g., check-in, individual tags a location, post identifies a device from which a post occurs, etc.) Decision service program 200 applies the information to update communication channel results 124. For example, decision service program 200 determines the customer is online (e.g., status of friends associated with the user depict the client as online) and/or that the customer posted a response one minute ago. Decision service program 200 determines the customer is online and responsive to social network posts, and updates communication channel results 124 to include the social network and/or raises the social network communication channel position within communication channel results 124 (e.g., real-time feedback indicates the customer is available and responsive). Conversely, decision service program 200 determines the customer is not online and/or the most recent post from the customer was a week ago, or post identifies the customer as unavailable (e.g., boarding flight to Houston). Decision service program 200 reorganizes communication channel results 124 to remove or lower preferred communications channels associated with the social networks within communication channel results 124.

In some other embodiment, decision service program 200 retrieves data from global positioning system enabled devices to provide additional information to further identify preferred communications channels within communication channel results 124. Decision service program 200 utilizes the GPS data to compare location data with stored location data associated with the unique client identifier and individual communication channels to update communication channel results 124. For example, a customer travels with a GPS enabled device. Decision service program 200 retrieves an update that identifies the location of the customer as being in a state park. Decision service program 200 determines the customer is not available by work phone and access to work e-mail may be limited based on the location. Decision service program 200 removes the work phone from communication channel results 124 and reduces the ranking of the e-mail communication channel, and increases the ranking of the mobile phone communication channel within communication channel results 124. In an alternate embodiment, decision service program 200 initially determines the day to be a Tuesday and the time to be 10 am, and therefore, decision service program 200 based on the information within data repository 122, identifies the work phone of the individual to be the highest ranked within communication channel results 124. However, decision service program 200 retrieves the GPS location of the individual from the GPS enabled device, and determines the GPS location matches the home address of the individual within a geo-fence as opposed to an office location. Decision service program 200 determines the user is at home instead of at work, raises the ranking of the home phone number within communication channel results 124 and removes and/or lowers the work phone number within communication channel results 124.

In yet another embodiment, decision service program 200 additionally identifies the purpose of the contact (e.g., response to client initiated contact, general follow-up, request for information, etc.) with the retrieved data from data repository 122. Decision service program 200 associates varying degrees of priority and/or business rules that are dependent upon the purpose of the contact that raise or lower the ranking of a communication channel. Decision service program 200 incorporates the purpose of the contact into communication channel results 124, thereby updating communication channel results 124 (e.g., may change the ranking, or ranking may stay the same). For example, the user enters the unique client identifier and indicates the purpose of the contact is to collect feedback from the customer for services rendered (e.g., quality assurance). As the purpose of the contact is for feedback, decision service program 200 determines the priority is low, and while a phone call is allowable, an e-mail is the preferred communication channel (e.g., provides a record of customer comments). Decision service program 200 identifies an e-mail address first, followed by a mobile phone number within communication channel results 124. Conversely, the customer initiates contact to report an issue and leaves a voice mail. Decision service program 200 associates a higher priority with a customer initiated call, and determines a return personal phone response is the preferred communication channel. In addition, decision service program 200 determines a customer initiated call overrides business rules that previously prohibited a user initiated phone call (e.g., time constrained business rule). Decision service program 200 identifies the mobile phone number first and the e-mail address second within communication channel results 124.

In yet some other embodiment, decision service program 200 utilizes an assigned and/or perceived severity level (e.g., high importance, normal, low, information only, etc.) of the contact with the unique client identifier. Decision service program 200 utilizes business rules, user rules, and decision logic to reorganize communication channel results 124. For example, decision service program 200 receives a low priority request for information associated with a unique client identifier. Decision service program 200 utilizes rules (e.g., business and/or user) and/or decision logic and rates the e-mail communication channel first, the physical address second, and the work phone third, and the mobile phone fourth. In another example, decision service program 200 receives a high priority request for a system failure and business rules indicate communications channels should be capable of immediate responses and/or instantaneous communication. Decision service program 200 reorganizes communication channel results 124 with the work phone first, the mobile phone number second, the e-mail address third, and removes the physical mailing address.

In yet another embodiment, decision service program 200 also identifies a manner in which decision service program 200 receives contact from the individual (e.g., e-mail, text, social media, mobile phone, work phone, home phone, etc.). Decision service program 200 utilizes rules and decision logic to update communication channel results 124 based on the identified manner of contact. Decision service program 200 rates a confirmed communication channel with a higher success rating than an unconfirmed communication channel. Additionally decision service program 200 rates the contact manner as a preferred contact method (i.e., customer utilized the communication channel to initiate contact therefore the communication is preferred by the customer.) Decision service program 200 reorganizes communication channel results 124 with respect to the additional success rating information with the confirmed communication channel and/or the preferred communication channel based on the contact manner. For example, an individual initiates contact for service to the user through an e-mail. Decision service program 200 identifies the e-mail address of the individual as a known successful communication channel and assigns a higher success rate with the e-mail communication channel than with a submitted phone number that is unconfirmed. Decision service program 200 updates communication channel results 124 with the updates success rate associated with the e-mail communication channel.

In various other embodiments, decision service program 200 determines communication channel results 124 with respect to business rules. In one embodiment, decision service program 200 removes communication channels from communication channel results 124 that are not compliant with the rules. For example, a user calls a customer in the morning, but did not successfully reach the customer (e.g., customer did not answer or return the call). The business rules prohibit the user from calling a customer a second time within a twenty-four hour period, but allows contact via social networks, e-mail, and of physical mailings. Decision service program 200 removes phone numbers (e.g., work, home, and cell) from communication channel results 124 and provides communication channel results 124 that are allowed (e.g., social networks, e-mail, and physical mailing addresses). In another embodiment, decision service program 200 marks the communication channels that are not compliant with the rules, thereby indicating communication should not be perused over the marked communication channels within communication channel results 124.

In yet some other embodiments, decision service program 200 determines communication channel results 124 as combination of one or more of the aforementioned embodiments. Decision service program 200 updates and/or refines the ordered ranking of preferred communications channels within communication channel results 124 based on the embodiments selected. Additionally, in an embodiment in which decision service program 200 determines communication was not successfully established, decision service program 200 removes or marks the failed communications channel from or within communication channel results 124. In another embodiment, decision service program 200 moves the failed communication channel to a list of attempted communication channels within communication channel results 124. In some other embodiment, decision service program 200 moves the failed communication channel to the end of the list formed by communication channel results 124. After a failure to establish communication via a preferred communication channel, in some embodiments, decision service program 200 re-determines and re-provides an updated instance of communication channel results 124 to the user (e.g., identifies new information that changes ranking, changes the ranking, and prevents the user from repeating a failed communication channel during the current session).

Decision service program 200 provides communication channel results 124 to the user through user interface 112 as an ordered listing. Decision service program 200 ranks the communication channels within communication channel results 124 with from the highest probability of establishing successful communication to the lowest probability of establishing communication. In some embodiments, decision service program 200 provides a subset of communication channel results 124 to the user (e.g., top five ranked communication channels, probability exceeds a percentage, untried communication channels, etc.). In another embodiment, decision service program 200 provides communication channel results 124 as a decreasing sized ordered list, as decision service program 200 removes failed communication channels form communication channel results 124 until the ordered list is empty and/or successful communication is established. For example, after a user attempts to establish communication over a communication channel and decision service program 200 determines the preferred communication channel failed, decision service program 200 removes the failed communication channel from communication channel results 124.

In step 210, decision service program 200 receives a selection from communication channel results 124. In one embodiment, decision service program 200 automatically selects the highest ranked communication channel (i.e., a preferred communication channel) within communication channel results 124. In another embodiment, decision service program 200 receives a selection within communication channel results 124 from the user through decision service client program 114 (e.g., highest ranked, lowest ranked, etc.) For example, the user reviews communication channel results 124, which ranks an e-mail communication as the highest communication channel. However, the user decides a phone call is likely to be more productive than and e-mail, and the user selects to initiate a phone call instead of sending an e-mail. Decision service program 200 progresses through communication channel results 124 (e.g., automatically and/or through user selections) until decision service program 200 determines the ordered list is exhausted and/or successful communication is established (steps 208-216).

In decision 212, decision service program 200 determines whether the selection from communication channel results 124 establishes successful communication. In one embodiment, decision service program 200 automatically records and catalogs received responses through a selected communications channel. Decision service program 200 monitors the selected communication channel from communication channel results 124 (e.g., electronic communications, e-mail, meeting request responses, social network posts, social network messages, integrated voice mail systems, etc.) for indications of successful communication. For example, the user sends an e-mail to a customer with a subject of "Product Demonstration." Decision service program 200 receives a response in the e-mail inbox of the user, in which the subject line of the e-mail is "RE: Product Demonstration." Decision service program 200 correlates the e-mail address that the original email was sent to (i.e., identifies recipients) and the e-mail address associated with the from header (i.e., identifies the sender) and correlates e-mail replies and/or forwards that include the same subject line, and determines communication is successfully established between the user and the customer. In another embodiment, decision service program 200 receives an automated response (e.g., out of office message) from the customer. In some other embodiment, decision service program 200 identifies the automated response as successful communication (e.g., response indicated e-mail was received) based on a rule or decision logic. In another embodiment, decision service program 200 determines the communication did not successfully establish communication based on rules and/or decision logic, as the response was automated (e.g., provided by a computing device and program logic) instead of an actual client response.

In another embodiment, decision service program 200 receives an indication of establishing successful communication from the user through decision service client program 114. Decision service program 200 receives the indication with the identified communication channel for further processing. For example, the user selects to call a work telephone number associated with the customer. The client answers the telephone and the user logs establishment of successful communication via the work telephone through decision service client program 114. Decision service program 200 receives the indication of the successful communication and the communication channel for further processing. Conversely, decision service program 200 receives a failure indication (e.g., does not establishing successful communication) from the user through decision service client program 114. For example, the user sends a brochure through the mail to a client. The user receives the brochure which is marked "undeliverable, return to sender." The user enters successful communication was not established via the physical mailing address, and upon receipt of the indication, decision service program 200 determines successful communication was not established.

In some embodiments, decision service program 200 sets a time limit to determine whether the selection from communication channel results 124 results in successful communication. The time limit is set by predefined conditions, business rules, and/or user rules and can vary based on the type of communication channel. For example, a response for a telephone call includes a time limit not to exceed a four hour window as indicated by company policy (e.g., one or more business rules), unless the four hour window occurs after and/or exceeds the standard working hours of 9 a.m. to 5 p.m., Monday through Friday (e.g., a call that occurs at 6 p.m., on a weekend, before 9 a.m., etc.) The response window would resume and/or begin the time limit upon the start of the next working day. Conversely an e-mail is associated with a longer time limit for a response corresponding to a day from the time sent, and/or a delay that starts the time limit based on receipt of a read receipt indicating that the client opened the e-mail.

In another embodiment, decision service program receives a time limit as an input from the user through decision service client program 114 and decision service program 200 sets the time limit based on the received user input. For example, the user calls the client on a Wednesday and listens to a voice mail message stating the client is out of office until the following Monday. The user inputs the return date of the client to be Monday, and decision service program 200 sets the time limit (e.g., countdown) to begin on Monday.

Decision service program 200 determines whether a response indicating successful communication is received by decision service program 200 and/or logged by a user via decision service client program 114 within the time limit. If decision service program 200 determines that the response is received within the time limit, then decision service program 200 determines that successful communication was established. If decision service program 200 determines that the response is not received within the time limit, then decision service program 200 determines that successful communication was not established.

If decision service program 200 determines the selection from communication channel results 124 establishes successful communication (decision 212, yes branch), then decision service program 200 records the successful communication channel in data repository 122 (step 218). If decision service program 200 determines that the selection from communication channel results 124 does not result in establishing successful communication (decision 212, no branch), then decision service program 200 records the failed communication channel in data repository 122 (step 214).

In step 214, decision service program 200 records the failed communication channel in data repository 122. Decision service program 200 identifies the communication channel (e.g., auto selection, user selection) selected from communication channel results 124. In one embodiment, decision service program 200 updates, within data repository 122, the success rate of the identified communication channel in response to the failure. Decision service program 200 recalculates the success rate with the added failure and thereby decreases the success rate associated with the identified communication channel. The decrease in the success rate indicates that the chances of establishing successful communication over the identified communication channel are reduced. Future iterations of decision service program 200 utilize the updated success rate associated with the identified communication channel to determine and/or re-determine communication channel results 124. In another embodiment, decision service program 200 removes the information associated with the failed communication channel from data repository 122. For example, a disconnected phone number, return receipt of undeliverable e-mail indicates that the information associated with the communication channel is erroneous and/or no longer viable (e.g., in service). Decision service program 200 deletes the phone number and e-mail address associated with the entry from data repository 122. Decision service program 200 removes the information associated with the failed communication channel from the data associated with the unique client identifier to prevent inclusion of the failed communication channel in communication channel results 124 is subsequent iterations of decision service program 200.

In one embodiment, decision service program 200 removes the failed communication channel from communication channel results 124 temporarily. For example, after each failed attempt to establish communication, decision service program 200 temporarily removes the failed communication channel and raises the next most likely (e.g., next preferred) communication channel to the top ranking within communication channel results 124 for the user to further utilize. In another embodiment, decision service program 200 temporarily marks the failed communication channel by setting a flag and/or changing the appearance of the associated communication channel (e.g., font, color, text effect) within communication channel results 124 to indicate the failure of the communication channel during the current session but does not alter the ranking (in subsequent iterations, decision service program 200 resets the flags when starting a new session). For example, decision service program 200 sets a flag, changes the font, and changes the color associated with the failed communication channel within communication channel results 124 to prevent the user from unknowingly repeating an attempt over a failed communication channel, but the order does not change. In another embodiment, decision service program 200 removes the failed communication channel permanently from both communication channel results 124 and data repository 122. For example, a phone number is disconnected (e.g., receive disconnection message) or an e-mail is returned as undeliverable. Decision service program 200 determines that the phone number or e-mail is no longer associated with a valid communication channel based on the failure, and removes the communication channel from data repository 122 (e.g., avoids wasted time in future iterations, removes erroneous data, etc.).

In decision 216, decision service program 200 determines whether additional selections remain within communication channel results 124. In one embodiment, decision service program 200 checks for remaining communications channels within communication channel results 124. For example, decision service program 200 removes failed communication channels from communication channel results 124 as decision service program 200 logs the failures, thereby decreasing the ranked number of entries within communication channel results 124. Decision service program 200 determines that communication channel results 124 is exhausted when communication channel results 124 no longer include entries that identify successful communication channels. Alternatively, decision service program 200 determines additional selections (e.g., communication channels) remain in communication channel results 124 upon identifying remaining entries (e.g., ordered list included untried communication channels). In another embodiment, decision service program 200 checks the status of a flag associated with each communication channel within communication channel results 124. Decision service program 200 determines whether the communication channel was utilized based on the flag setting (i.e. decision service program 200 changes the status of the flag upon logging a failure). Decision service program 200 determines additional selections (e.g., communication channels) remain in communication channel results 124 if at least one entry includes a flag in which the status does not indicate a logged failure (e.g., flag setting is not changed, does not indicate a prior attempt to establish communication). Alternatively decision service program 200 determines that additional selections do not remain in communication channel results 124 if the status flag for each entry in communication channel results 124 is set.

If decision service program 200 determines that additional selections remain in communication channel results 124 (decision 216, yes branch), then decision service program 200 determines and provides communication channel results 124 (step 208). If decision service program 200 determines that additional selections do not remain in communication channel results 124 (decision 216, no branch), then decision service program 200 terminates.

In step 218, decision service program 200 records the successful communication channel in data repository 122. Decision service program identifies the communication channel (e.g., auto selection, user selection) selected from communication channel results 124 associated with the successful communication channel within data repository 122. Decision service program 200 updates the success rate of the identified communication channel with the successful communication indication. Decision service program 200 recalculates the success rate with the added successful communication indication and thereby increases the success rate associated with the identified communication channel (e.g., preferred communication channel). The increase in the success rate indicates that the chances of establishing successful communication over the identified communication channel have increased (e.g., are more favorable, are more likely to occur, have an increased probability of success, or is a preferred communication channel, etc.). Future iterations of decision service program 200 utilize the updated value associated with the identified communication channel to provide an improved instance of communication channel results 124.

Figure 3:
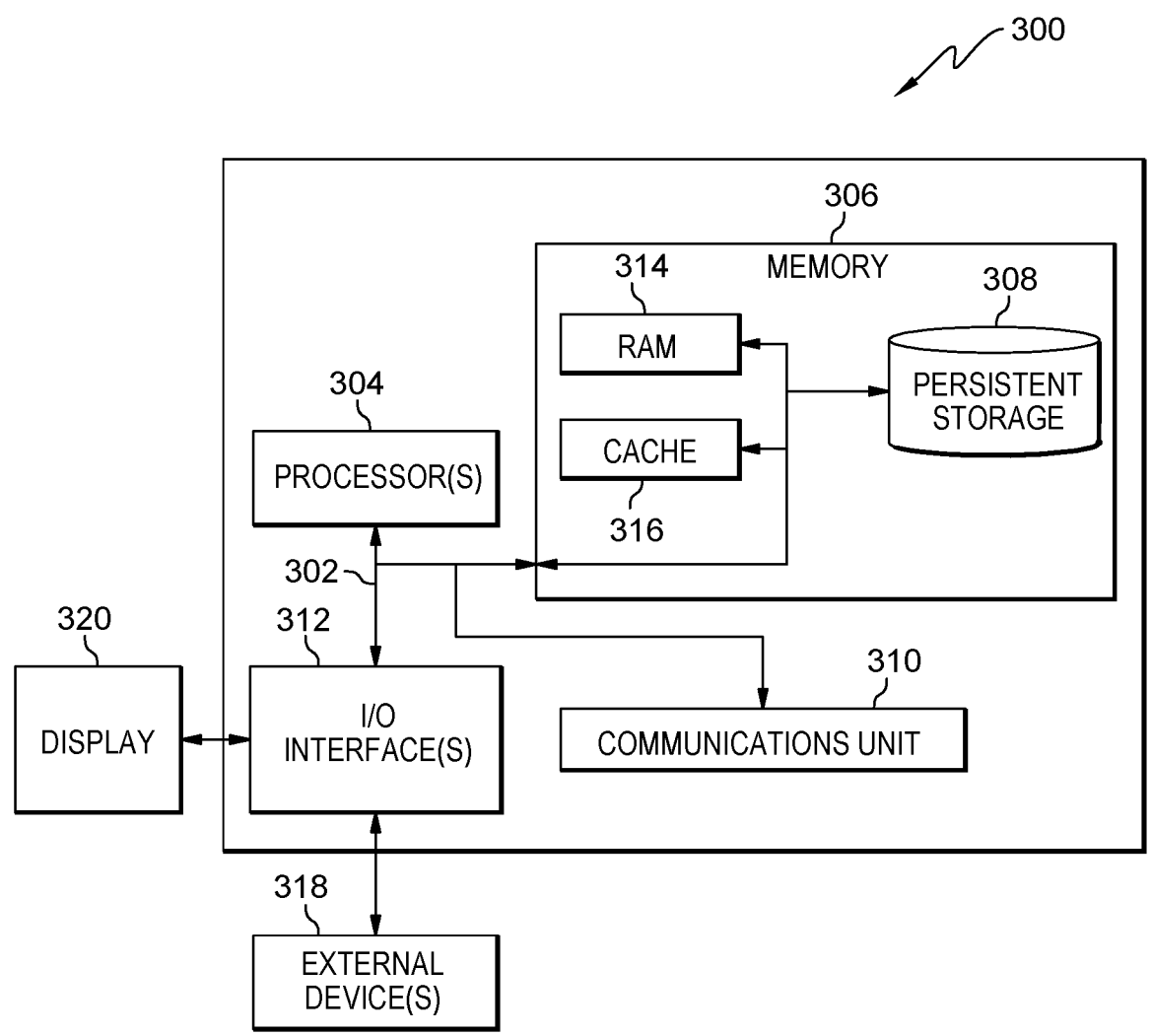
FIG. 3 is a block diagram of components of the server computer executing the decision service program, in accordance with an embodiment of the present invention.

FIG. 3 depicts a block diagram of components of server computer 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

User interface 112, decision service client program 114, data repository 122, communication channel results 124, and decision service program 200 may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. User interface 112, decision service client program 114, data repository 122, communication channel results 124, and decision service program 200 may be downloaded to persistent storage 308 through communications unit 310.

I/O interface(s) 312 allows for input and output of data with other devices that may be connected to server computer 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., user interface 112, decision service client program 114, data repository 122, communication channel results 124, and decision service program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a preferred communication channel, the method comprising:
   receiving, by one or more computer processors, a query wherein the query includes: a unique client identifier, a purpose of contact, a severity, and an initial manner of contact, wherein the severity is, as pre-defined in a rules, a determined degree of impact to a user that an encountered defect with respect to a component has on the ability of a user to perform work;
   retrieving, by one or more computer processors, one or more communication channels from an entry within a data repository, wherein the entry is associated with the received query;
   determining, by one or more computer processors, whether the entry within the data repository that is associated with the unique client identifier identifies a wearable device that includes physical activity information, wherein the wearable device includes at least heart rate monitoring and activity tracking;
   responsive to determining that the entry within the data repository associated with the unique client identifier identifies a wearable device, retrieving, by one or more computer processors, the physical activity information from the wearable device;
   determining, by one or more computer processors, a real-time period of availability based on the retrieved physical activity information from the wearable device;
   determining, by one or more computer processors, one or more communication channel results based, at least in part, on one or more success rates respectively associated with the retrieved one or more communication channels within the data repository and the determined real-time period of availability from the wearable device;
   creating, by one or more computer processors, a first ordered list of communication channel results in which the determined one or more communication channel results are ordered based, at least in part, on the one or more success rates of the determined one or more communication channels and the determined real-time period of availability from the wearable device;
   selecting, by one or more computer processors, a preferred communication channel from the created first ordered list of communication channel results; and
   initiating, by one or more computer processors, a communication via the selected preferred communication channel.

2. The method of claim 1, further comprising:
   determining, by one or more computer processors, a status of the initiated communication, wherein the status of the initiated communication identifies one of: a failed communication and a successful communication; and
   updating, by one or more computer processors, a success rate of the initiated communication within the data repository based on the status of the initiated communication, wherein the success rate of the initiated communication is one of the one or more success rates respectively associated with the retrieved one or more communication channels.

3. The method of claim 1, further comprising:
   determining, by one or more computer processors, whether the entry within the data repository associated with the unique client identifier includes information that identifies one or more social networks in which an individual associated with the unique client identifier is a member; and
   responsive to determining that the entry within the data repository associated with the unique client identifier includes information that identifies one or more social networks in which the individual is a member:
   retrieving, by one or more computer processors, activity information pertaining to the unique client identifier from the one or more social networks, wherein the retrieved information includes a status of the individual associated with the unique client identifier, a post by the individual associated with the unique client identifier, and a location of the individual associated with the unique client identifier;
   determining, by one or more computer processors, one or more times of availability based on the retrieved activity information; and
   creating, by one or more computer processors, a second ordered list of communication channel results by modifying the first ordered list of communication channel results based, at least in part, on the determined one or more times of availability.

4. The method of claim 1, further comprising:
determining, by one or more computer processors, whether the entry within the data repository associated with the unique client identifier identifies a global positioning system enabled device;
responsive to determining that the entry within the data repository associated with the unique client identifier identifies the global positioning system enabled device:
retrieving, by one or more computer processors, a GPS location of an individual associated with the unique client identifier from the global positioning enabled device; and
creating, by one or more computer processors, a second ordered list of communication channel results by modifying the first ordered list of communication channel results based, at least in part, on the GPS location of the individual associated with the unique client identifier.

5. The method of claim 1, further comprising:
creating, by one or more computer processors, a second ordered list of communication channel results by modifying the first ordered list of communication channel results based on the purpose of contact, the severity, and the initial manner of contact.

6. The method of claim 1, further comprising:
determining, by one or more computer processors, that the received query complies with one or more rules wherein the one or more rules are based, at least in part, on one or more business rules that are based on one or more policies, wherein the one or more policies identify at least a time period to respond to a client and a restriction to limit contact attempts without reciprocal contact from the client, and one or more user rules that are based on personal knowledge.

7. A computer program product for determining a preferred communication channel, the computer program product comprising:
one or more computer readable storage media and program instructions stored on the one or more computer readable storage media, the program instructions comprising:
program instructions to receive a query wherein the query includes: a unique client identifier, a purpose of contact, a severity, and an initial manner of contac, wherein the severity is, as pre-defined in a rules, a determined degree of impact to a user that an encountered defect with respect to a component has on the ability of a user to perform work t;
program instructions to retrieve one or more communication channels from an entry within a data repository, wherein the entry is associated with the received query;
program instructions to determine whether the entry within the data repository that is associated with the unique client identifier identifies a wearable device that includes physical activity information, wherein the wearable device includes at least heart rate monitoring and activity tracking;
responsive to determining that the entry within the data repository associated with the unique client identifier identifies the wearable device, program instructions to retrieve the physical activity information from the wearable device;
program instructions to determine a real-time period of availability based on the retrieved physical activity information from the wearable device;
program instructions to determine one or more communication channel results based, at least in part, on one or more success rates respectively associated with the retrieved one or more communication channels within the data repository and the determined real time period of availability from the wearable device;
program instructions to create a first ordered list of communication channel results in which the determined one or more communication channel results are ordered based, at least in part, on the one or more success rates of the determined one or more communication channels and the determined real-time period of availability from the wearable device;
program instructions to select a preferred communication channel from the created first ordered list of communication channel results; and
program instructions to initiate a communication via the selected preferred communication channel.

8. The computer program product of claim 7, further comprising:
determine a status of the initiated communication, wherein the status of the initiated communication identifies one of: a failed communication and a successful communication; and
update a success rate of the initiated communication within the data repository based on the status of the initiated communication, wherein the success rate of the initiated communication is one of the one or more success rates respectively associated with the retrieved one or more communication channels.

9. The computer program product of claim 7, wherein to determine one or more communication channel results based, at least in part, on one or more success rates respectively associated with the retrieved one or more communication channels within the data repository and the retrieved real-time activity information further comprises:
determine whether the entry within the data repository associated with the unique client identifier includes information that identifies one or more social networks in which an individual associated with the unique client identifier is a member; and
responsive to determining that the entry within the data repository associated with the unique client identifier includes information that identifies one or more social networks in which the individual is a member:
retrieve activity information pertaining to the unique client identifier from the one or more social networks, wherein the retrieved information includes: a status of the individual associated with the unique client identifier, a post by the individual associated with the unique client identifier, and a location of the individual associated with the unique client identifier;
determine, one or more times of availability based on the retrieved activity information; and
create a second ordered list of communication channel results by modifying the first ordered list of communication channel results based, at least in part, on the determined one or more times of availability.

10. The computer program product of claim 7, wherein to determine one or more communication channel results based, at least in part, on one or more success rates respectively associated with the retrieved one or more communication channels within the data repository and the retrieved real-time activity information further comprises:

determine whether the entry within the data repository associated with the unique client identifier identifies a global positioning system enabled device;

responsive to determining that the entry within the data repository associated with the unique client identifier identifies the global positioning system enabled device:
 retrieve a GPS location of an individual associated with the unique client identifier from the global positioning enabled device; and
 create a second ordered list of communication channel results by modifying the first ordered list of communication channel results based, at least in part, on the GPS location of the individual associated with the unique client identifier.

11. The computer program product of claim 7, further comprising:
create a second ordered list of communication channel results by modifying the first ordered list of communication channel results based on the purpose of contact, the severity, and the initial manner of contact.

12. The computer program product of claim 7, further comprising:
determine that the received query complies with one or more rules wherein the one or more rules are based, at least in part, on: one or more business rules that are based on one or more policies, wherein the one or more policies identify at least a time period to respond to a client and a restriction to limit contact attempts without reciprocal contact from the client, and one or more user rules that are based on personal knowledge.

13. A computer system for determining a preferred communication channel, the computer system comprising:
one or more computer processors, one or more computer readable storage media, and program instructions stored on the computer readable storage media for execution by at least one of the one or more processors, the program instructions comprising:
program instructions to receive a query wherein the query includes: a unique client identifier, a purpose of contact, a severity, and an initial manner of contact, wherein the severity is, as pre-defined in a rules, a determined degree of impact to a user that an encountered defect with respect to a component has on the ability of a user to perform work;
program instructions to retrieve one or more communication channels from an entry within a data repository, wherein the entry is associated with the received query;
program instructions to determine whether the entry within the data repository that is associated with the unique client identifier identifies a wearable device that includes physical activity information, wherein the wearable device includes at least heart rate monitoring and activity tracking;
responsive to determining that the entry within the data repository associated with the unique client identifier identifies the wearable device, program instructions to retrieve the physical activity information from the wearable device;
program instructions to determine a real time period of availability based on the retrieved physical activity information from the wearable device;
program instructions to determine one or more communication channel results based, at least in part, on one or more success rates respectively associated with the retrieved one or more communication channels within the data repository and the determined real-time period of availability from the wearable device;
program instructions to create a first ordered list of communication channel results in which the determined one or more communication channel results are ordered based, at least in part, on the one or more success rates of the determined one or more communication channels and the determined real-time period of availability from the wearable device;
program instructions to select a preferred communication channel from the created first ordered list of communication channel results; and
program instructions to initiate a communication via the selected preferred communication channel.

14. The computer system of claim 13, further comprising:
determine a status of the initiated communication, wherein the status of the initiated communication identifies one of: a failed communication and a successful communication; and
update a success rate of the initiated communication within the data repository based on the status of the initiated communication, wherein the success rate of the initiated communication is one of the one or more success rates respectively associated with the retrieved one or more communication channels.

15. The computer system of claim 13, wherein to determine one or more communication channel results based, at least in part, on one or more success rates respectively associated with the retrieved one or more communication channels within the data repository and the retrieved real-time activity information further comprises:
determine whether the entry within the data repository associated with the unique client identifier includes information that identifies one or more social networks in which an individual associated with the unique client identifier is a member; and
responsive to determining that the entry within the data repository associated with the unique client identifier includes information that identifies one or more social networks in which the individual is a member:
 retrieve activity information pertaining to the unique client identifier from the one or more social networks, wherein the retrieved information includes a status of the individual associated with the unique client identifier, a post by the individual associated with the unique client identifier, and a location of the individual associated with the unique client identifier;
 determine, one or more times of availability based on the retrieved activity information; and
 create a second ordered list of communication channel results by modifying the first ordered list of communication channel results based, at least in part, on the determined one or more times of availability.

16. The computer system of claim 13, wherein to determine one or more communication channel results based, at least in part, on one or more success rates respectively associated with the retrieved one or more communication channels within the data repository and the retrieved real-time activity information further comprises:
determine whether the entry within the data repository associated with the unique client identifier identifies a global positioning system enabled device;
responsive to determining that the entry within the data repository associated with the unique client identifier identifies the global positioning system enabled device:
 retrieve a GPS location of an individual associated with the unique client identifier from the global positioning enabled device; and create a second ordered list of communication channel results by modifying the first ordered list of communication channel results based, at least in part, on the GPS location of the individual associated with the unique client identifier.

17. The computer system of claim 13, further comprising: create a second ordered list of communication channel results by modifying the first ordered list of communication channel results based on the purpose of contact, the severity, and the initial manner of contact.

* * * * *